Nov. 12, 1968　　　L. W. HURST ET AL　　　3,409,998
DRYING OF CARBON BLACK PELLETS
Filed Dec. 30, 1966　　　　　　　　　　　　　　2 Sheets-Sheet 1
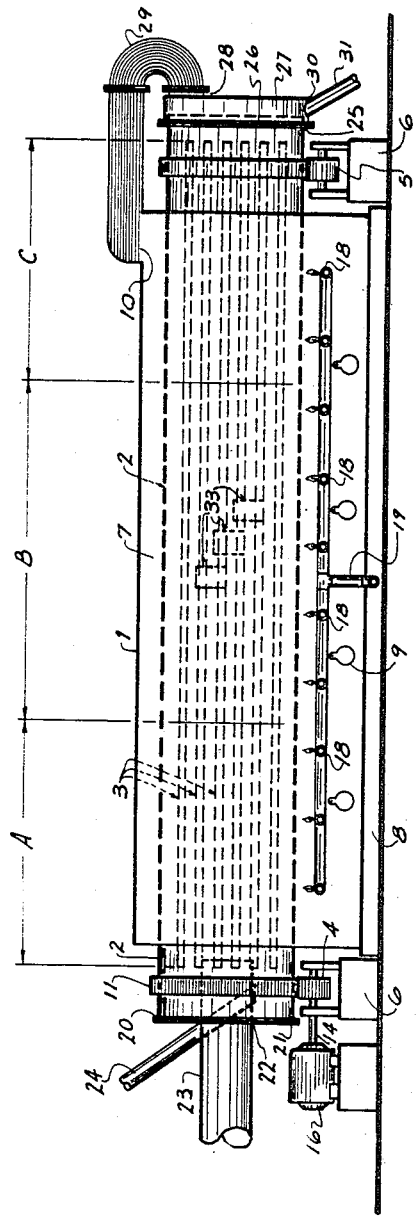
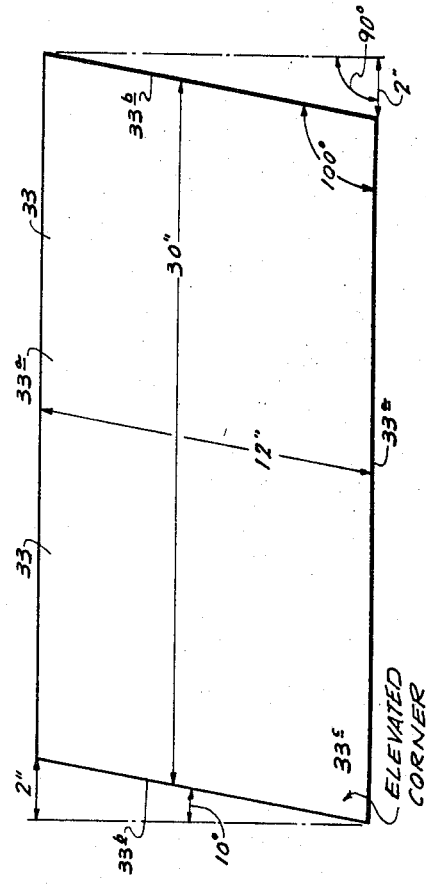
LEWIS W. HURST
ROBERT L. POWELL
WILLIAM E. PENN
INVENTORS
BY　*L. David Bagnell*
ATTORNEY

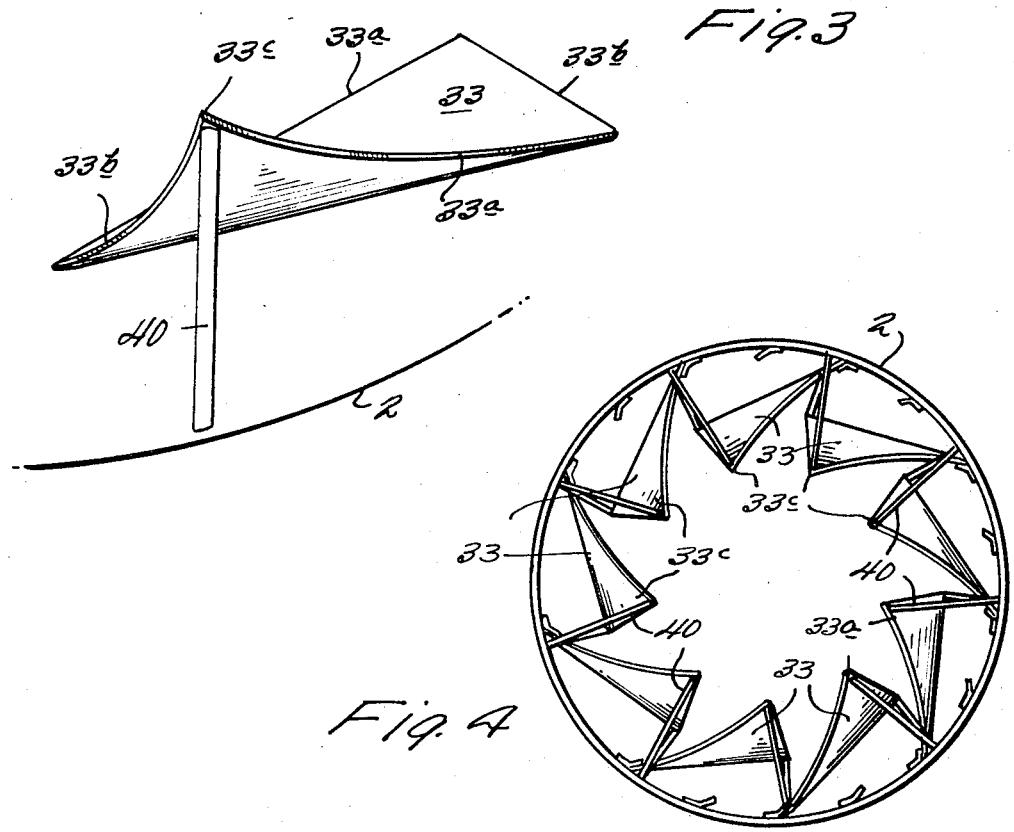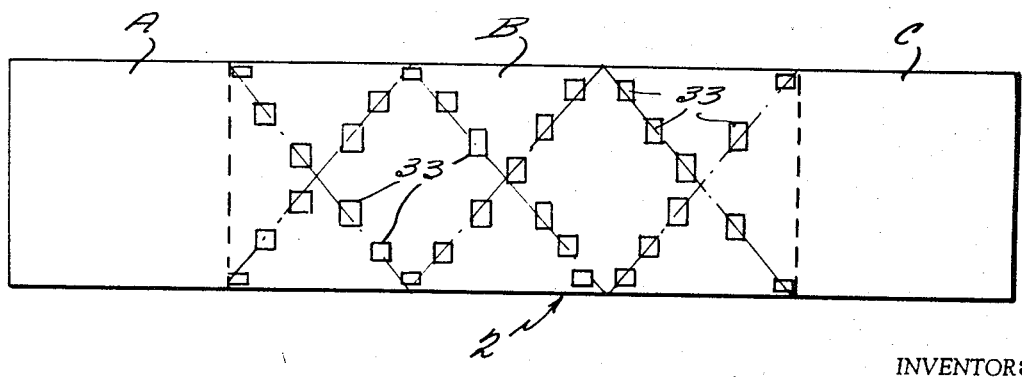

United States Patent Office 3,409,998
Patented Nov. 12, 1968

3,409,998
DRYING OF CARBON BLACK PELLETS
Lewis W. Hurst, Robert L. Powell, and William E. Penn, Hobbs, N. Mex., assignors to Continental Carbon Company, Houston, Tex., a corporation of Delaware
Filed Dec. 30, 1966, Ser. No. 606,230
3 Claims. (Cl. 34—135)

ABSTRACT OF THE DISCLOSURE

Apparatus for drying particulate matter comprising a rotating dryer drum encased in a heating means and having improved lifters and a helical lifter arrangement within the drum. The lifters are strip-like members that have one end secured to the inner wall of the drum and extend perpendicularly to the drum axis, with the other end extending angularly from the drum wall and having the end nearest drum opening elevated.

---

This invention relates to the drying of particulate materials, and more particularly to the drying of wet or moist carbon black. In the wet pelleting, or pelletizing, of carbon black according to commercial practices, the pellets formed in and emanating from the pelletizer are known to contain substantial quantities of moisture, usually water, which must be removed prior to further processing steps or shipment.

Most frequently the wet or moist pellets are tumbled or mildly agitated in a horiozntally disposed and suitably heated drying drum.

In order to adequately dry the pellets in a commercially feasible period of time, it has, in most instances, been necessary to heat the interior of the drying drum to relatively high temperatures (for example, 400° F. to 420° F.) which has had a damaging effect on the pellets. That is, the pellets crack and break down when subjected to such temperatures, and result in an undesirably high percentage of fines and nonuniform pellets in the end product. This is due, for the most part, to the tendency of the highly heated rotary drum to rapidly dry the outer surfaces of the pellets thereby causing the explosion thereof as the moisture therewithin attempts to escape. The drying time required to eliminate the water from the pellets in prior art drums with poor movement of pellets therethrough frequently causes the pellets to be crushed and otherwise subjected to forces of attrition causing increased fines, dust and nonuniform pellets in the final product.

It has hereintofore been proposed to take further advantage of the available heat by providing the interior of the rotary drum with a series of vanes or fins which to some extent roll and turn the pellets as they are tumbled about within the drum; but so far as we are aware none of these prior art structures have been very successful in actual practice in eliminating the degradation of the pellets of the final product.

It is among the objects of the present invention to provide novel and improved means on the interior of a rotary drying drum for enabling the effective drying of wet or moist carbon black pellets in a minimum of time and with a minimum of heat thereby avoiding the aforementioned undesirable cracking and breaking-down of the pellets and the accompanying inclusion in the end product of objectionable quantities of fines and nonuniform pellets.

Another object is the provision of apparatus for attaining the foregoing objectives which is not only effective for its intended purpose, but which is easy and inexpensive to manufacture, install and maintain on either new rotary dryers or those of existing design.

Further objects and advantages resulting from the practice of the present invention will be apparent to one skilled in the art upon study of the following description and annexed drawings, wherein like reference characters designate like parts, and wherein:

FIGURE 1 is an elevational view of a conventional drying drum of the type usually employed for drying wet or moist carbon black pellets and representing in dotted lines the nature and disposition of several of the novel and improved lifter members of the invention;

FIGURE 2 is a detail view illustrating more precisely the size, shape, and dimensions of a lifter member of a typical installation;

FIGURE 3 is a perspective of one of the aforementioned lifter members;

FIGURE 4 is an end view of the horizontally disposed rotary drying drum to be rotated in a clockwise manner illustrating the dispostion therein of a series of the said lifter members; and FIGURE 5 is a diagrammatic plan illustrating the arrangement of the two series of the inclined and spirally disposed lifter members on the interior of the dryer drum, each of said lifter members being so constructed and arranged as not to shed the carbon black pellets from the upper surface thereof until it has risen to a position approximately that of a horizontal plane extending longitudinally through the axis of the drum.

Referring more particularly to the drawings, in FIGURE 1 the numeral 1 generally designates a horizontally extending drum dryer employed in the drying of wet or moist carbon black pellets which emanate from the pelletizing apparatus (not shown); the drum dryer includes a rotatable drum 2 constructed of a suitable metal such as steel or alloy thereof and having a plurality of interior longitudinally extending fins or vanes 3 which produce a forward feeding effect.

In FIGURE 1 the drum 2 is shown as rotatably supported by oppositely disposed pinion 4 and roller 5 which are mounted on standards 6 at suitable longitudinally spaced intervals. The drum 2 is enclosed by a housing member 7 adapted to enclose the drum of a heating means comprising a base 8, draft ports 9, and an exhaust outlet 10.

The drum 2 is supported by peripheral gear 11 and guide member 12, and rotation is imparted to the drum 2 in any convenient manner, as by peripheral gear 11 meshing with pinion 4 communicating with the shaft 14 of an adjacently disposed electric motor 16. The horizontally extending rotary drum 2 is heated by means of fuel burners 18 within housing member 7 and connected by pipe 19 with a source of fuel.

At one end, the drum is provided with a flange 20 having affixed thereto a head plate 21 having a central opening 22 through which the exhaust gas conduit 23 is slidably mounted through opening 22 into drum 2. Conduit 23 is adapted to receive black inlet pipe 24 which passes through conduit 23 and opening 22 for the introduction of carbon black pellets from the wet pelletizing operation (not shown) into drum 2. The opposite end of drum 2 is provided with a flange 25 mounting a gasket 26 slidably supporting fixed cylindrical hood 27 allowing drum 2 to rotate within hood 27. The hood 27 is provided with an aperture 28 in the upper portion of the end communicating with gas inlet conduit 29 extending from aperture 10 of housing member 7, and said hood 27 is provided in the lower portion with a discharge aperture 30 communicating with product discharge pipe 31.

As indicated in the drawings, the horizontally extending drum 2 comprises three separate and longitudinally distinct areas A, B and C.

The area A of the drum 2 is adjacent the black inlet pipe 24 and its inner wall is entirely conventional in design. So, too, is the area C which is adjacent the outlet pipe 31 and which is of substantially the same dimensions.

However, the intermediate longitudinal area B of the drum 2 is provided on its inner surface with the lifter members 33 of the invention. As shown in FIGURES 2 and 3, the lifter members 33 are of elongate strip-like formation with substantially parallel side edges 33a, and ends which, while parallel to each other, are diagonally disposed with respect to the side edges; thereby providing an outline which is prapezoidal when viewed in plan.

All of the elongate strip-like lifter members 33 are of the same size, shape and construction; and accordingly, for all present purposes, description of but one should suffice.

In a present and highly satisfactory working embodiment the elongate strip-like lifter member 33 (and all of them) is of Type 316, 16-gauge stainless steel, 30-inches in length and 12-inches in width; and the ends 33b (which are parallel to each other) are cropped along lines which depart at approximately 100° angles (or a total of 2-inches) from the parallel side edges 33a. In addition, one corner of the lifter member 33 is curvilinearly elevated, as shown at 33c. In this same working embodiment of the invention, the horizontally extending rotary drum 2 is 51½ feet in lenth and 5½ feet in diameter, the areas A and C each 11 feet in length; and the intermediately disposed lifter area B is 29½ feet in length.

Thirty-two of the elongate strip-like lifter members 33 are secured to the inner surface or wall of the drum 2, and extend in a direction which is generally perpendicular to the axis of said drum; one end 33b of each lifter member being directly secured to the inner wall of the drum in any suitable fashion, and other end 33b being supported at its curvilinearly elevated corner 33c by at least one support means 40 of a 1-inch by 1-inch 16-gauge angle which is welded to the bottom of the lifter member at 33c and to the immediately underlying portion of the inner surface or wall of the drum, optionally an additional means 40 can be affixed to said lifter member 33 at elevated corner adjacent 33c.

The lifter members 33 are so disposed on the inner surface or wall of the drum 2 that the curvilinearly elevated corners 33c thereof are most adjacent the inlet end of the drum; which results not only in turning and rolling the carbon black pellets being dried, but also in moving, or redistributing the same backwardly onto the bed or main body portion thereof, thereby accomplishing more uniform drying. Also, the discharging or shedding of the carbon black pellets from the curvilinearly elevated corners 33c of the elongate strip-like lifter members 33 backwardly toward the inlet end of the drying drum increases the length of time the pellets are retained in contact with the drying medium within the drum.

The lifter members 33 carry the carbon black pellets out of the bed in the bottom of the drum and commence to shed or spill the same therefrom practically immediately, and this action continues until the discharge end, or curvilinearly elevated corner 33c, has risen to a position approximately that of a horizontal plane extending longitudinally through the axis of the drum.

The foregoing construction and arrangement allows the heat and heated gases within the drum to work over, under and through the carbon black pellets more effectively.

An important feature of the present invention involves the arrangement of the elongate strip-like lifter members 33 in the particular spaced end-to-end and side-by-side relationship illustrated in the drawings. More specifically, this arrangement constitutes a double helix or spiral, with the two cycles thereof each making 1½ turns or revolutions on the inner surface or wall of the drum.

The lifter members 33 pick up only a portion of the bed of carbon black pellets and discharges it toward the inlet end of the drum; and the continued in-put of carbon black pellets through the inlet pipe 24 and the forward feeding effect of the usual longitudinally extending vanes 3 cause the bed of pellets to generally move toward the drum outlet end and discharge pipe 31.

Actually, there is a higher level of carbon black pellets at the inlet end of the drum than at the outlet or discharge end thereof.

As the drum rotates, the lifter members 33 assist in levelling the bed of particulate material which is moving toward the low-level or discharge end of the drum.

The lifter members 33 restrict the flow to a considerable extent, but the bed moves toward the low-level or outlet end of the drum.

With the present working embodiment specifically described herein, very satisfactory drying of wet or moist carbon black pellets is accomplished at temperatures of between 330° F. and 350° F. in the same amount of time that without the lifter members 33 required much higher temperatures, i.e., between 400° F. and 420° F.

In addition to savings in cost of heating, and wear-and-tear on the equipment due to the higher temperatures, the quality of the carbon black pellets is materially enhanced.

Having thus described our invention what we claim as new and desire to secure by Letters Patent is:

1. Apparatus for drying particulate material including carbon black pellets comprising, in combination:
   a substantially horizontally disposed rotatable drum having entrance and discharge openings;
   a housing member about substantially enclosing the intermediate portion of said drum including heating means therein to heat said drum and a conduit adapted to pass heated gases from said member through said drum;
   a series of elongated strip-like lifter members secured to the inner wall of and helically arranged in endwise alignment within said drum;
   the major axis of each of said strip-like lifter members extending in a direction which is generally perpendicular to the longitudinal axis of said drum;
   one end of each of said strip-like lifter members being in contact with the inner wall of said drum;
   the other end of each of said strip-like lifter members extending angularly from the inner wall of said drum;
   the last-mentioned end of each of said strip-like lifter members having its end which is nearest the discharge opening of said drum curvilinearly elevated;
   whereby the particles to be dried and moving from the entrance end of the drum to the discharge end thereof are engaged by said strip-like lifter members and caused to frictionally contact one another in a tumbling fashion and for the most part directed toward the entrance opening of said drum by the curvilinearly elevated portion of said lifter members.

2. The apparatus of claim 1 wherein the elongate strip-like lifters are arranged in a double helix with the two cycles of the double helix spaced approximately 180° apart.

3. The apparatus of claim 1 wherein the elongate strip-like lifter members are arranged in a double helix with the two cycles of the double helix spaced approximately 180° apart, and with each cycle of the elongate strip-like lifter members making 1½ revolutions on the inner wall of the drum.

References Cited

UNITED STATES PATENTS

| | | |
|---|---|---|
| 957,646 | 5/1910 | Boughton. |
| 1,072,143 | 9/1913 | Mills et al. |
| 1,096,103 | 5/1914 | Giesler. |
| 1,105,812 | 8/1914 | McKaig _____ 259—3 |
| 1,921,114 | 8/1933 | Blackelsberg. |
| Re. 19,664 | 8/1935 | Damon. |
| 2,187,601 | 1/1940 | Glaxner. |
| 2,959,869 | 11/1960 | Ackerman _____ 34—135 |
| 3,333,344 | 8/1967 | Loewen _____ 34—142 XR |

KENNETH W. SPRAGUE, *Primary Examiner.*